United States Patent Office 3,523,932
Patented Aug. 11, 1970

3,523,932
THERMOPLASTIC COMPOSITION
Johan G. Aalbers and Johannes C. Zwaneveld, Bodegraven, Netherlands, assignors to Chem-Y Fabriek van Chemische Produkten N.V., Bodegraven, Netherlands, a corporation of the Netherlands
No Drawing. Filed Dec. 30, 1966, Ser. No. 605,989
Claims priority, application Netherlands, Dec. 30, 1965, 6517203
Int. Cl. C08f 27/00
U.S. Cl. 260—88.2
10 Claims

ABSTRACT OF THE DISCLOSURE

Olefin polymer compositions are provided having antistatic properties which include, as anti-static agents, polyglycol carboxylic acids of the formula $$R-(O-CHR'-CH_2)_n-O-CH_2-COOH$$

wherein R is an aliphatic or cycloaliphatic hydrocarbon radical of 1–20 carbon atoms or an aliphatic-aromatic radical of 1–20 carbon atoms in its aliphatic moiety, R' is hydrogen or methyl or both, and $n$ is 1–40.

---

This invention relates to thermoplastic compositions containing antistatic agents, and to shaped objects, especially films, entirely or partially consisting of such composition, and to processes for imparting antistatic properties to such polymers. More particularly, this invention relates to such compositions, shaped objects and processes, wherein the thermoplastic polymer is an alkene polymer, such as a homopolymer, copolymer, interpolymer, block copolymer, graft coplymer etc. of an olefin, or of two or more olefins, or of one or more olefins with one or more other copolymerizable monomers.

It has already been proposed to use polyglycolether derivatives as antistatic agents for polyolefins. Thus, it is already known that mono-alkyl ethers of polyglycols, and mono-alkylaryl ethers of such polyglycols are each per se insufficiently compatible with polyolefins so that they cannot be added in sufficient amounts to obtain a good antistatic effect. According to a known proposal mixtures of compounds from these two classes are used, because such mixtures have a better compatibility with polyolefins and accordingly can be used in large amounts. According to the abovementioned proposal such mixtures are used in an amount of 2 to 9%, preferably 3 to 5%, based on the polyolefin. Such large proportions of antistatic agent are, however, extremely uneconomical, whilst moreover, an additional mixing step is necessary, for obtaining the desired mixture of antistatic agents. Apparently, even the antistatic action of such mixtures in such large amounts is still insufficient, since it has also been proposed to add moreover either mono-esters of polyglycols with high aliphatic or aliphatic-aromatic carboxylic acids, or unsubstituted polyglycols in which case the antistatic agent is an even more complicated mixture.

It is an object of the present invention to provide thermoplastic materials containing efficient antistatic agents.

It is a further object of the invention to provide thermoplastic materials which show efficient antistatic properties, even though they contain considerably less than one percent of antistatic agent.

A still further object of the invention is to provide such thermoplastic materials which have been rendered antistatic without detracting from their other desirable properties.

A still further object of the invention is to provide antistatic thermoplastic materials in the form of films which can be used for packaging purposes, e.g. food products.

Further objects and advantages of the present invention will appear from the following description.

According to the invention it has been found that acids of the formula $$R-(O-CHR'-CH_2)_n-O-CH_2-COOH$$

are excellent antistatic agents. In this formula R is an aliphatic (including cycloaliphatic) hydrocarbon radical of 1–20 carbon atoms or an aliphatic-aromatic radical containing 1–20 carbon atoms in its aliphatic moiety or moieties, R' is hydrogen or methyl or both, and $n$ is a number having an average value of 1–40. An aliphatic radical or moiety R may have a straight or branched chain.

As a class the above acids are known (vide e.g. U.S. Pat. 2,183,853). They can be prepared by reacting a compound R—OH with ethylene oxide and/or propylene oxide, followed by a reaction of the so obtained compound $R-(-CHR'-CH_2)_n-OH$ with a haloacetic acid in an alkaline medium. In the reaction with the alkylene oxide(s) a mixture of compounds having various values of $n$ is formed. Of course, it is possible to separate a single compound from the reaction mixture, either before or after the reaction with the haloacetic acid, but for most practical purposes this is highly uneconomical so that in most cases the obtained mixtures are used in their entirety, or one recovers cuts wherein the value of $n$ is within certain limits from such mixtures and uses or further reacts them in that form.

The starting product R—OH can be a technical grade product which is commercially available. Thus, a well-known commercial product is technical grade lauryl alcohol which apart from the $C_{12}$ alcohol may contain 20–30% of other alcohols, chiefly myristyl alcohol.

The above-defined acids are used in antistatic amounts, i.e. in quantities wherein they exert the desired antistatic action. The exact amount will vary of course with the nature of the thermoplastic material, the form of this material and the form in which it will be used ultimately, and the nature of the chosen polyglycol-carboxylic acid. However, for most practical purposes the antistatic agent of this invention will be used in a quantity of at least 0.05% by weight, based on the thermoplastic material, in order to obtain an appreciable antistatic action whilst on the other hand amounts of more than 5% by weight will yield no further improvement of the antistatic properties, and might even detract from other useful properties.

The thermoplastic materials are preferably olefin polymers, such as polyolefins, e.g. polyethylene, polypropylene, and copolymers of ethylene and propylene, and other copolymers which can be prepared from one or more alkylenes with one or more copolymerizable monomers. The nature of the comonomers is not critical; the only requirement is that they should be copolymerizable with one or more alkylenes to form thermoplastic materials. The expression "copolymers" is used here in the broadest sense, and includes not only the classical copolymers, but also e.g. block copolymers, graft copolymers, etc. The thermoplastic material can be the product of any kind of polymerization or copolymerization, such as bulk, solution, suspension or emulsion polymerization or copolymerization.

As is well known in the art, several catalysts can be used for preparing olefin polymers, not only the classical catalysts, but also the Ziegler catalysts. According to the invention one can use polymers prepared with any of these catalysts.

The antistatic agents of this invention can be incorporated in the thermoplastic material during or after the polymerization. The agents may be incorporated throughout the material, e.g. during a moulding, extruding or other shaping treatment, but they can also be applied as a surface film on the shaped products, e.g. on sheets or foils.

The thermoplastic compositions of this invention can also contain other usual adjuvants, such as fillers, stabilizers, plasticizers, colorants, slip or anti-slip agents, anti-blocking agents, anti-fogging agents, antioxidants and the like, in amounts wherein such agents are compatible with the present antistatic agents.

The thermoplastic products of this invention can also be subjected to a treatment which makes them receptive to inks, such as corona, discharge, flame treatment, etc.

If the thermoplastic compositions of this invention have the form of fibers or films, they can be oriented by mono- or bi-axial stretching.

The thermoplastic materials of this invention can also be subjected to heat sealing.

The following examples serve to further illustrate the invention, but are not to be construed in limitation thereof.

In a first series of experiments two commercial polyethylene products were used which did not contain any additive, "Stamylan 1500," a high-pressure polyethylene (soft polyethylene), and "Eltex 6009," a low-pressure (hard) polyethylene. Both products are sold by the Netherlands State Mines.

The compounds to be tested were incorporated in the polyethylene by rolling, using a rolling temperature of 130° C. for the high-pressure polyethylene, and of 160° C. for the low-pressure polyethylene. The so obtained sheets were pressed to form bodies of 100 x 100 x 3 mm. This was done in an electrically heated "PHI" press using an open frame die, and using a pressure of about 18,140 kg., a preheating time of 3 minutes, and a pressing time of 1 minute. The pressing temperature was 140° C. for the high-pressure polyethylene and 170° C. for the low-pressure polyethylene.

The electrostatic performance of the samples was tested according to the "ash pick up test." In this test the sample is electrostatically charged by rubbing with a woollen cloth, and then placed over fresh cigarette ash at a distance of 1 inch. The quantity of ash attracted by the sample is a measure of the antistatic performance.

The following compounds of the formula

R—(O—CHR'—CH$_2$)n—OCH$_2$—COOH were tested:

| Compound No. | R | R' | Average value of $n$ |
|---|---|---|---|
| 1 | Lauryl[1] | H | 3 |
| 2 | do.[1] | H | 5 |
| 3 | do.[1] | H | 10 |
| 4 | do.[1] | H | 14 |
| 5 | Oleyl | H | 7 |
| 6 | do | H | 10 |
| 7 | do | H | 14 |
| 8 | Stearyl | H | 7 |
| 9 | do | H | 10 |
| 10 | do | H | 14 |
| 11 | Nonylphenyl | H | 7 |

[1] Technical grade.

EXAMPLE I

The compounds to be tested were incorporated in an amount of 1% by weight in "Stamylan 1500." The results are maintained in the following table.

| Additive (compound) | Amount of ash after— | | |
|---|---|---|---|
| | 3 days | 2 weeks | 3 months |
| None | Much | Much | |
| 1 | None | None | Hardly any. |
| 2 | do | do | Do. |
| 3 | do | do | None. |
| 4 | do | | Do. |
| 5 | do | None | Do. |
| 6 | Hardly any | Hardly any | Hardly any. |
| 7 | None | | Do. |
| 8 | Hardly any | Hardly any | Little. |
| 9 | None | | Do. |
| 10 | Very little | | Do. |
| 11 | Little | | Do. |

For purposes of comparison it is mentioned here that "Antistatic Agent 273E" sold by Fine Organics Inc., and recommended to be used in polyethylene and polypropylene in proportions of about 0.5–1% by weight when used in an amount of 1% by weight in this same polyethylene) yielded the result "hardly any ash" in the ash pick-up test after three days.

EXAMPLE II

The above-defined Compounds 2 and 5 were again tested in Stamylan 1500 according to the same general procedure as outlined hereinabove, but this time in concentrations of 0.25% by weight, 0.5% by weight and 1.5% by weight. The ash pick-up test was performed in all cases after three days and after 1 month. Compound 2 yielded in all these concentrations the result "no ash" after three days.

After one month the concentrations of 0.25 and 0.50% yielded the result "little ash," and the concentration of 1.5% yielded the result "hardly and ash."

Also compound 5 yielded the result "no ash" after three days in all these concentrations. After one month the result "little ash" was obtained with the concentrations of 0.25 and 0.5%, whilst the concentration of 1.5% again yielded the result "no ash."

EXAMPLE III

The experiments of Example I were repeated, but this time with "Eltex 6009." The results are given in the following table:

| Additive (compound) | Amount of ash after— | | |
|---|---|---|---|
| | 3 dyas | 2 weeks | 3 months |
| None | Much | | |
| 1 | None | None | Little. |
| 2 | Hardly any | Hardly any | Do. |
| 3 | do | do | Do. |
| 4 | None | None | Do. |
| 5 | Hardly any | Hardly any | Do. |
| 6 | None | None | None. |
| 7 | do | do | Do. |
| 8 | Very little | Very little | |
| 9 | do | Hardly any | |
| 10 | Hardly any | do | |
| 11 | Very little | | |

EXAMPLE IV

The above-defined compounds 2 and 6 were again tested in Eltex 6009 according to the same general procedure as outlined above, but this time in concentrations of 0.25% by weight, 0.5% by weight and 1.5% by weight.

The results were as follows:

| | Wt. percent | Amount of ash after— | |
|---|---|---|---|
| | | 3 days | 1 month |
| Compound 2 | 0.25 | Little | |
| | 0.5 | Hardly any | Rather much. |
| | 1.5 | None | Hardly any. |
| Compound 6 | 0.25 | Hardly any | Little. |
| | 0.5 | None | None. |
| | 15. | do | Do. |

EXAMPLE V

A number of compounds were tested for their antistatic action on a polypropylene foil having a weight of 15 grams/m.[2]. A piece of 6 x 15 cm. of the foil was dipped in an alcoholic solution of the compound to be tested.

After drying with a fan the treated piece was conditioned at 20° C. and 65% relative humidity for 24 hours. Thereaftre the ash pick up test was carried out. All compounds tested in this example were used as 1/32% solutions in ethanol. As appears from the table hereinafter, positive results were obtained, even in this low concentration.

The following compounds of the formula $$R-(OC_2H_4)_nOCH_2COOH$$

were tested.

| Compound | R | n (average value) |
|---|---|---|
| a | $C_2H_5$ | 4.5 |
| b | $C_6H_{13}$ | 4.5 |
| c | $C_6H_{13}$ | 10 |
| d | Lauryl (70% $C^{12}$ + 30% $C^{14}$). | 10 |

The results are summarized in the following table. In this table a positive antistatic action is indicated with "+," a weak antistatic action with "w," and the absence of antistatic action with "—."

| Compound | Antistatic action after— | | |
|---|---|---|---|
| | 1 day | 4 days | 5 days |
| a | + | + | — |
| b | + | + | w |
| c | + | w | — |
| d | + | w | — |

What we claim is:

1. Alkylene homopolymer and copolymer composition containing an antistatic agent, wherein said antistatic agent consists essentially of at least one acid of the formula $$R-(OCHR'-CH_2)_n-CH_2-COOH$$

wherein R is a radical selected from the group consisting of aliphatic and cycloaliphatic hydrocarbon radicals of no more than 20 carbon atoms, and aliphatic-aromatic radicals containing no more than a total of 20 carbon atoms in its aliphatic part, R' is selected from the group consisting of hydrogen, methyl, and mixtures thereof, and n is a number having an average value of 1–40.

2. Alkylene polymer composition according to claim 1, wherein said composition contains 0.50 to 5% by weight of said antistatic agent.

3. Alkylene polymer composition according to claim 1 wherein said antistatic agent is distributed substantially throughout the composition.

4. Alkylene polymer composition according to claim 1 wherein said antistatic agent is chiefly present at at least one of the surfaces of said composition.

5. Alkylene polymer composition according to claim 1 wherein said polymer is a homopolymer.

6. Alkylene polymer composition according to claim 1 wherein said alkylene polymer is a copolymer.

7. Alkylene polymer composition according to claim 1 wherein said polymer is a copolymer of at least two olefins.

8. Alkylene polymer composition according to claim 1 wherein said composition is in solid phase in the form of a film.

9. Alkylene polymer composition according to claim 1 wherein said composition is in solid phase in the form of a fiber.

10. Alkylene polymer composition according to claim 1 wherein said composition is in solid phase in the form of a shaped body.

References Cited

UNITED STATES PATENTS 2,556,045  6/1951  Serdywsky et al. ____ 260—31.8
3,190,763  6/1965  Schleede et al. _____ 106—186

JOSEPH L. SCHOFER, Primary Examiner

R. A. GAITHER, Assistant Examiner

U.S. Cl. X.R.

260—93.7, 94.9, 878

UNITED STATES PATENT OFFICE
CERTIFICATE OF CORRECTION

Patent No. 3,523,932          Dated August 11, 1970

Inventor(s) Johan G. Aalbers et al.

It is certified that error appears in the above-identified patent and that said Letters Patent are hereby corrected as shown below:

<u>Column 2,</u> line 26, delete "R-(--CHR'--CH$_2$)$_n$--OH" and insert -- R-(O-CHR'--CH$_2$)$_n$-- OH --;

<u>Column 6,</u> claim 2, delete "0.50" and insert --0.05--

Signed and sealed this 2nd day of November 1971.

(SEAL)
Attest:

EDWARD M. FLETCHER, JR.  
Attesting Officer

ROBERT GOTTSCHALK  
Acting Commissioner of Patents